Patented Oct. 16, 1945

2,386,756

UNITED STATES PATENT OFFICE 2,386,756

METHOD OF PRESERVING LATEX AND PRODUCT THEREOF

William D. Stewart, Akron, Ohio, assignor to The B. F. Goodrich Company, New York, N. Y., a corporation of New York No Drawing. Application October 27, 1943, Serial No. 507,870

4 Claims. (Cl. 260—820)

This invention relates to a method of preserving latex, particularly fresh latex, and to the product thereof.

Latex that has been freshly-collected from the rubber trees contains enzymes that, together with the bacteria picked up in handling the latex, cause the latex to putrefy and coagulate within a relatively short time. Various methods of preserving the latex have been proposed in the past, such as the ammonia treatment now commonly used, but all these have been only generally effective and all have been more or less unsatisfactory.

I have discovered a method of treating latex, particularly freshly-collected latex, to produce a sterile, stable product capable of being stored for long periods of time without putrefaction or coagulation. By the method of this invention the pH of the latex is adjusted to a value of from 9.8 to 10.0 and then there is added a small proportion of a member or members of the class consisting of those azo dyes, nitroso dyes, and triphenyl methane dyes having a solubility of not less than about 0.01%, by weight, in the alkaline latex. In the case of the preferred freshly-collected latex it should be treated within not more than eighteen hours after being collected from the rubber tree. The pH of the latex can be adjusted by adding a buffer solution, alkali, alkaline salt, ammonia, or the like, to the latex until the pH reaches the specified range. Then the dye is added. Examples of dyes that may be used in this invention include gentian violet, crystal violet, acriflavine, flavine, basic fuchsin, thionin, corallin yellow, toluidine blue, dahlia, malachite green, methyl green, pararosaniline, methyl violet, methylene violet, and the like. These dyes, and others of similar nature, may be used either alone or in combination to make the improved preserved latex of this invention. The dyes may be used in any desired proportion but usually should be employed in amounts ranging from about 0.01% to about 0.20% by weight of the latex. They may be added either before or after the pH of the latex has been adjusted to the specified range and, if necessary, the pH may be readjusted after addition of the dye or dyes to bring the pH back within the range of 9.8 to 10.0.

Ammonia is the preferred material for use in adjusting the pH of the latex as it is easy to use, can be easily removed from the latex, and does not unduly complicate compounding of the latex. When the preferred freshly-collected latex is preserved the usual amount of ammonia will be from about 0.25% to 0.35% by weight of the latex. In this invention the ammonia, or other material, is insufficient alone to preserve the latex but the combination with the dye does produce a latex that remains sweet and pure for long periods.

In a specific example of this invention ammonia is added to freshly-collected latex until the pH is raised to 10.0 and immediately thereafter 0.09% of gentian violet by weight of the latex is added to the latex. This produces a latex that will remain sweet and uncoagulated for long periods of time.

I have found through numerous experiments that raising the pH of the latex to within the relatively narrow range of 9.8 to 10.0 and then treating the latex with one or more of the dyes disclosed herein produces a preserved latex that will remain sweet and unchanged over long periods of time with no danger of coagulation and putrefaction. The dyes can also serve a dual purpose in that a preserved and colored latex may be prepared in one operation by the choice of a dye to give any desired color from among the group of dyes disclosed herein. This method of preserving latex is likewise applicable to preserving latex that is not freshly-collected but that has been preserved by other means although the method is more specific to the preservation of freshly-collected latex.

As will be apparent from the foregoing the preserved latex prepared according to this invention ordinarily will contain only the natural latex itself and the ammonia or other material added in adjusting the pH together with the azo dyes, the nitroso dyes, and the triphenyl methane dyes as described. Any of the usual compounding or conditioning agents may later be added as desired to prepare the latex for specific uses but such materials preferably are not added at the plantation.

This application is a continuation-in-part of my copending application Serial No. 371,200, filed December 21, 1940.

Having disclosed my invention it is my desire to protect it broadly within the spirit and scope of the invention as set out in the appended claims.

I claim:

1. The method of preserving freshly-collected latex which comprises treating the said latex within about eighteen hours after its collection from the tree by adding to the said latex a quantity of alkaline material equivalent to from about 0.25% to 0.35% ammonia by weight of the latex, said quantity being insufficient alone to preserve the latex, and also adding from about 0.01% to about 0.20% by weight of the latex of a dye selected from the class consisting of the azo dyes, the nitroso dyes and the triphenyl methane dyes, said dye being soluble in the alkaline latex to the extent of at least approximately 0.01% by weight.

2. The method of preserving freshly-collected latex which comprises treating the said latex within about eighteen hours after its collection from the tree by adding to the said latex not more than about 0.35% by weight of ammonia together with not more than about 0.20% by weight of a dye selected from the class consisting of the azo dyes, the nitroso dyes and the triphenyl methane dyes, said dye being soluble in the ammoniated latex to the extent of at least approximately 0.01% by weight.

3. Preserved latex prepared in accordance with the method of claim 1.

4. Preserved latex prepared in accordance with the method of claim 2.

WILLIAM D. STEWART.